US011218386B2

(12) United States Patent
Kumar et al.

(10) Patent No.: US 11,218,386 B2
(45) Date of Patent: Jan. 4, 2022

(54) SERVICE TICKET ESCALATION BASED ON INTERACTION PATTERNS

(71) Applicant: Microsoft Technology Licensing, LLC, Redmond, WA (US)

(72) Inventors: Udayan Kumar, Kirkland, WA (US); Nishant R. Bhatt, Redmond, WA (US); Rakesh Namineni, Sammamish, WA (US); Manoj Kumar, Lynnwood, WA (US); Michael David Helm, Seattle, WA (US); Cole Robert Fornia, Bothell, WA (US); Chitra Mandyam, Issaquah, WA (US); Ramanathan Muthiah, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 16/579,096

(22) Filed: Sep. 23, 2019

(65) Prior Publication Data

US 2021/0092029 A1  Mar. 25, 2021

(51) Int. Cl.
   *H04L 12/24* (2006.01)
(52) U.S. Cl.
   CPC ........ *H04L 41/5074* (2013.01); *H04L 41/044* (2013.01); *H04L 41/0622* (2013.01); *H04L 41/0631* (2013.01)
(58) Field of Classification Search
   None
   See application file for complete search history.

(56) References Cited

U.S. PATENT DOCUMENTS

| 7,130,885 | B2 * | 10/2006 | Chandra ............... G06Q 10/10 709/206 |
| 9,172,809 | B1 | 10/2015 | Mockus et al. |
| 2002/0138582 | A1 * | 9/2002 | Chandra ............. G06Q 10/107 709/206 |
| 2002/0147611 | A1 * | 10/2002 | Greene .......... G06Q 10/063112 705/1.1 |

(Continued)

OTHER PUBLICATIONS

"International Search Report and Written Opinion Issued in PCT Application No. PCT/US20/038855", dated Sep. 11, 2020, 19 Pages.

(Continued)

*Primary Examiner* — Ranodhi Serrao
(74) *Attorney, Agent, or Firm* — Liang IP, PLLC

(57) ABSTRACT

Techniques for managing support computing services in computing systems are disclosed. One example technique includes analyzing data representing a service ticket having data representing multiple messages exchanged between the user and a support entity of a support tier in the computing system. Based on the analysis, an interaction pattern in the multiple messages can be identified. The interaction pattern includes a sequence of words or phrases arranged in a chronological order. The method can further include determining whether the identified interaction pattern matches one or more interaction patterns corresponding to previously escalated service tickets and triggering a notification of the immediate escalation of the service ticket to another support entity in another support tier in response to determining that the interaction pattern matches one of the one or more interaction patterns corresponding to previously escalated service tickets.

20 Claims, 4 Drawing Sheets

(56) References Cited

U.S. PATENT DOCUMENTS

| | | | | |
|---|---|---|---|---|
| 2002/0165727 A1* | 11/2002 | Greene | ................ | H04L 63/102 705/1.1 |
| 2002/0165745 A1* | 11/2002 | Greene | ................... | H04L 67/16 717/103 |
| 2002/0188538 A1* | 12/2002 | Robertson | ........... | H04L 41/5058 705/35 |
| 2003/0004744 A1* | 1/2003 | Greene | ................... | H04L 67/42 705/1.1 |
| 2003/0004774 A1* | 1/2003 | Greene | ................... | H04L 67/16 705/7.14 |
| 2005/0240621 A1* | 10/2005 | Robertson | ........... | H04L 67/1095 |
| 2006/0059107 A1* | 3/2006 | Elmore | ............. | G06Q 30/0601 705/64 |
| 2006/0059253 A1* | 3/2006 | Goodman | .............. | G06Q 10/06 709/223 |
| 2006/0126801 A1 | 6/2006 | Laperi et al. | | |
| 2011/0270770 A1 | 11/2011 | Cunningham et al. | | |
| 2011/0270771 A1 | 11/2011 | Coursimault et al. | | |
| 2015/0142720 A1 | 5/2015 | Beechuk et al. | | |
| 2015/0346918 A1 | 12/2015 | Bodda et al. | | |
| 2016/0099892 A1 | 4/2016 | Palakovich et al. | | |
| 2017/0169438 A1 | 6/2017 | Maynard et al. | | |
| 2017/0270419 A1 | 9/2017 | Sanchez Charles et al. | | |
| 2019/0347668 A1* | 11/2019 | Williams | ............ | H04L 67/2833 |

OTHER PUBLICATIONS

"Transferring Tickets: SmarterTrack Help", Retrieved From: https://help.smartertools.com/SmarterTrack/current/Default.aspx?qq=%2fSmarterTrack%2fcurrent%2fTopics%2fTickets%2fTransferTicket.aspx, Retrieved On: May 14, 2019, 2 Page.

Verzino, Alyssa, "How Automation can Help Customer Service Deal with Ticket Escalation", Retrieved From: https://medium.com/talla-inc/how-automation-can-help-customer-service-deal-with-ticket-escalation-5f45a601cf5b, Feb. 2012, 4 Pages.

* cited by examiner

SERVICE TICKET ESCALATION BASED ON INTERACTION PATTERNS

BACKGROUND

Large scale computing systems, such as datacenters, can have millions or even tens of millions of individual devices. For example, in a datacenter, a large number of routers, switches, bridges, load balancers, or other network devices can interconnect servers, network storage devices, and other computing devices. Individual servers can host one or more virtual machines, virtual switches, or other types of virtualized functions configured to provide computation, communications, storage, or other suitable types of computing services to users.

During operation, many hardware and software components can experience various types of "incidents" such as hardware/software failures, over utilization of resources, misconfigurations, communication losses, etc. Such incidents can cause service interruptions that trigger users or tenants of the computing service to initiate an alert or support request. A support management system is typically utilized to receive and process such alerts and support requests. The support management system can also track progress of diagnosis, mitigation, resolution, or other actions related to each alert and support request using individual service tickets.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Operators of large-scale computing systems can receive large numbers (e.g., thousands or even tens of thousands) of alerts and support requests every day. A challenge for operators is to achieve speedy resolution of reported incidents while maintaining costs of support low. To address such a challenge, operators often deploy multiple support tiers in a support management system. Higher support tiers can have more experienced and typically more expensive support facilities and/or agents than lower support tiers. For instance, a lower support tier can include technicians while a higher support tier can include engineers and/or developers. During operation, service tickets may be handled by lower support tiers initially. A portion of the service tickets can then be escalated to higher support tiers when lower support tiers fail to address the reported incidents. Such push-based escalation can take a very long time for a service ticket to reach a suitable support tier that is adequately equipped to resolve a reported incident. Long delays in providing suitable support can reduce user experience of the provided computing services and incur large expenses such as costs at each support tier and a loss of business.

Several embodiments of the disclosed technology are directed to a support management system that is configured with automated escalation of service tickets based on, inter alia, interaction patterns between a support entity and a user. As such, certain service tickets may be escalated to higher support tiers without going through intermediate support tiers. In certain implementations, the support management system can include a framework with multiple service ticket candidate modules (referred to herein as "candidate modules") configured to generate a list of service tickets as candidates for immediate escalation. The framework can be configured to combine input from the multiple candidate modules and generates a single view for support entities at various support tiers. As such, service ticket duplication for escalation may be reduced or even eliminated. In certain embodiments, the candidate modules can include a predictive module, a keyword module, a spike module, and a time-based module. Each of the foregoing candidate modules are described in turn below. In other embodiments, the framework can also include one or more other suitable types of candidate modules in lieu of or in addition to the foregoing candidate modules. In any of the foregoing embodiments, the framework can be flexible to allow addition, modification, and/or removal of various candidate modules based on suitable operating conditions.

The predictive module can be configured to predict likeliness of escalation of individual service tickets based on an interaction model. The interaction model can be developed to output a likeliness of escalation based on support interactions, service configurations, or other suitable parameters of service tickets and/or reported incidents from previous escalated service tickets. For example, a conversation pattern between a user and a support agent can be mined to identify if the conversation pattern sufficiently matches with those of previously escalated service tickets. The interaction model can be developed using neural network-based or other suitable types of machine learning techniques. In one example, vector representations of messages to/from user/support agent, changing of severity, addition of notes by the support agent, and/or other interaction parameters can be created for service tickets that have been previously escalated. Using the created vectors, a model developer (e.g., a neural network) can apply suitable types of machine learning techniques to develop and/or update the interaction model. In other implementations, derivative patterns based on similar occurrences of observed interactions can also be established and included in the interaction model.

During operation, the predictive module can be configured to analyze, based on the interaction model, text, elapsed time, or other interaction patterns and compare such interaction patterns to those of service tickets previously escalated. By computing a level of difference between the interaction pattern and those of previously escalated service tickets, the predictive module can be configured to determine a likelihood or probability that the service ticket is to be escalated. Based on the determined likelihood, the predictive module can then determine, for example, based on a preset threshold, whether to identify the service ticket as an escalation candidate. In response to determining to immediately escalate the service ticket, the predictive module can, for instance, trigger an update of data or metadata of the service ticket to indicate a new escalated support tier and transmit a copy or notification of the service ticket to a support agent at a higher support tier In response to determining not to escalate the service ticket, the predictive module can wait for further updates to the service ticket and repeat the analysis based on the further updates.

The keyword module can be configured to identify correlations of certain keywords with a likelihood of escalation of corresponding service tickets and use such keywords to identify service tickets as escalation candidates. For example, a list of "hot" keywords or key phrases can be generated from data or metadata of previously escalated service tickets using machine learning or other suitable techniques. Such as list can be updated based on current "hot" issues, such as a current security threat from a "wannacry ransomware." When an incoming service ticket is received, the keyword module can identify the service ticket as an escalation candidate when one or more of such "hot" keywords or key phrases appear in the incoming service ticket. For instance, an example "hot" key phrase can be "wannacry ransomware" or "email down." As such, the keyword module can be configured to indicate a high likelihood of escalation of an incoming service ticket when the service ticket also has "wannacry ransomware" or "email down" as a part of a problem description. In other examples, the "hot" keywords can also include certain error codes, error messages, and/or other suitable description included in the service tickets.

The spike module can be configured to identify a systemic issue involved in multiple service tickets and combine the multiple service tickets as a single service ticket as an escalation candidate. For instance, when multiple service tickets reporting the same or similar connectivity issue, instead of tackling each service ticket separately, the spike module can be configured to combine all the service tickets into a single service ticket related to the connectivity issue. The spike module can then be configured to determine whether a number of the service tickets related to the single issue is abnormally higher than a threshold. In response to determining that the number is abnormally higher than the threshold, the spike module can be configured to identify the combined single service ticket an escalation candidate.

The time-based module can be configured to identify a service ticket as an escalation candidate based on an amount of elapsed time since the service ticket is received or created. In certain implementations, different time thresholds can be implemented for different users, user groups, or types of users based on service level agreements, subscription tiers, and/or other suitable parameters. During operation, the time-based module can compare an elapsed time since a service ticket is pending to a corresponding time threshold. Based on the comparison, when the elapsed time exceeds the time threshold, the time-based module can be configured to identify the service ticket as an escalation candidate. In other implementations, a single time threshold can be set for all users.

Upon receiving the identified escalation candidates from the foregoing modules, the support management system can be configured to combine the identified escalation candidates into a single list. The support management system can then be configured to provide the list of escalation candidates to various support entities/agents at higher support tiers for selection. In certain embodiments, the support management system can provide the list to all support tiers for selection. In other embodiments, the list can be provided to the various support tiers from the highest to the lowest for selection. Upon detecting selection of one of the service tickets by a higher support tier, the service ticket is removed from selection by any lower support tiers. In further embodiments, the various candidate modules can also identify a predicted support tier for each of the escalation candidates. In response, the support management system can be configured to forward multiple different lists to corresponding higher support tiers. In yet further embodiments, the escalation candidates can be provided to the various support tiers in other suitable manners.

As such, unlike push-based escalation technique according to which a service ticket is escalated stepwise from lower support tiers to higher support tiers, several embodiments of the support management system can be configured to implement pull-based escalation to skip certain lower support tiers. For instance, a subset of received service tickets can be provided as escalation candidates to higher support tiers for selection based on, for instance, criticality of reported incidents and availability of suitable support entities, or other suitable parameters. As such, service tickets related to critical incidents may be prioritized to skip escalations through lower support tiers. By reducing delays to resolve critical incidents reported in the selected service tickets, speedy notification, mitigation, remediation, or resolution of reported incidents can be achieved to improve user experience of various computing services provided in large scale computing systems.

DETAILED DESCRIPTION

Figure 1:
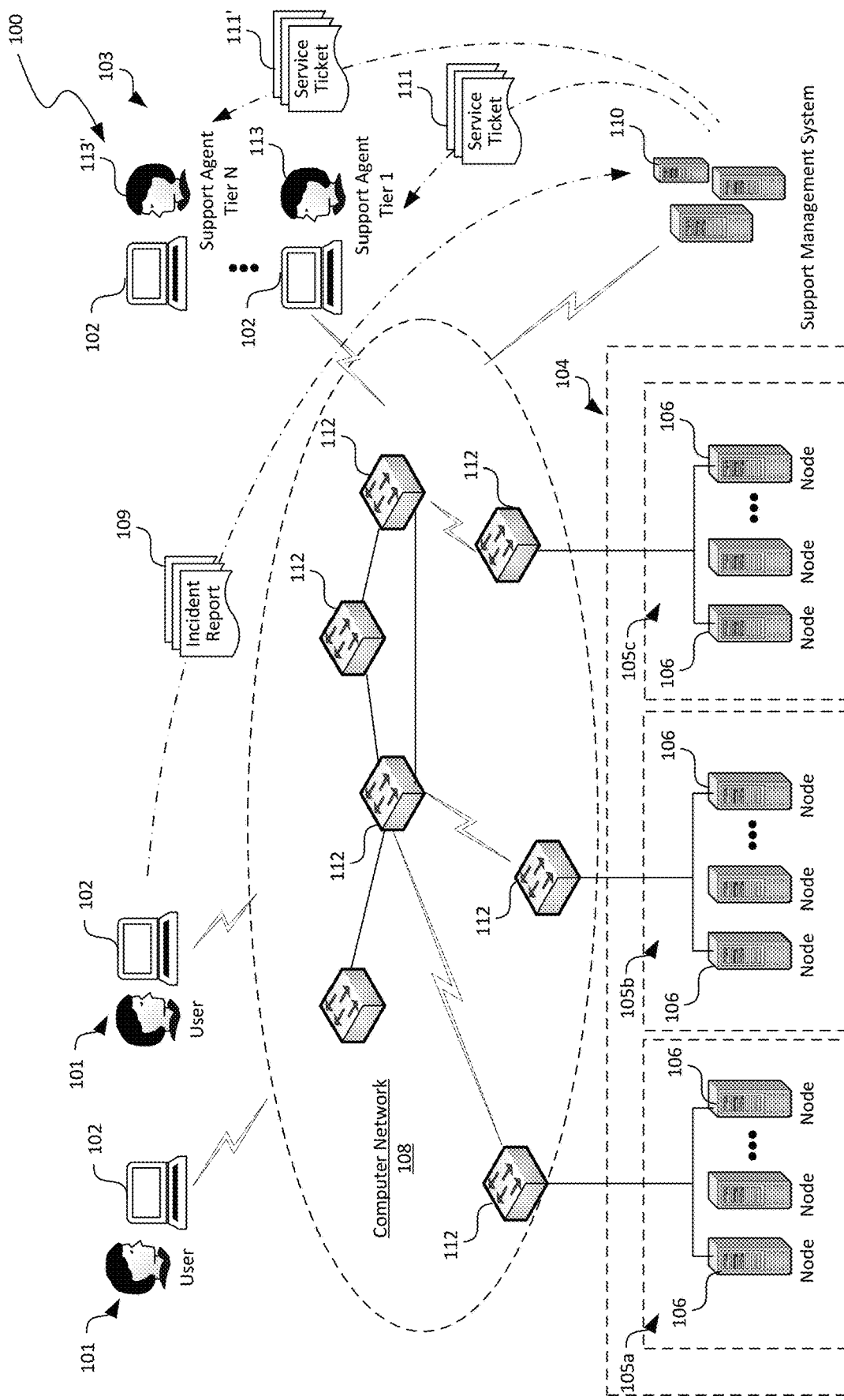
FIG. 1 is a schematic diagram illustrating a computing system implementing service ticket escalation based on interaction patterns in accordance with embodiments of the disclosed technology.

Certain embodiments of systems, devices, components, modules, routines, data structures, and processes for managing service ticket escalation in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

As used herein, the term "computing cluster" generally refers to a computing system having a plurality of network devices that interconnect multiple servers or nodes to one another or to external networks (e.g., the Internet). One example of a computing cluster is one or more racks each holding multiple servers in a cloud computing datacenter (or portions thereof) configured to provide cloud services. One or more computing clusters can be interconnected to form a "computing fabric," which forms at least a part of a distributed computing system. The term "network device" generally refers to a network communications component. Example network devices include routers, switches, hubs, bridges, load balancers, security gateways, or firewalls. A "node" generally refers to a computing device configured to implement one or more virtual machines, virtual routers, virtual gateways, or other suitable virtualized computing components. In one example, a node can include a computing server having a hypervisor configured to support one or more virtual machines.

Further used herein, the term "cloud service" or "computing service" generally refers to one or more computing resources provided over a computer network, such as the Internet. Common examples of cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

As used herein, the term "service ticket" or "support ticket" generally refers to a record of digital data containing information that describes interactions between a user and a service representative, a support technician, a support team, or other suitable types of support entity. A service ticket can be used to create, update, track, and resolve any issues a user may report. For instance, upon receiving an alert or support request, a service ticket can be created and stored in a datastore with an issue description, time of report, and/or other suitable information. The service ticket can then be updated with data identifying support tasks performed on the service ticket, messages exchanged between the user and a support entity, technical solutions provided to the user, results of applied technical solutions, and/or other suitable information related to resolving the reported issue. Examples of messages exchanged between the user and the support entity can include (e.g., recorded phone calls, emails, instant messages, text messages, or other suitable forms of communication.

Also used herein, a "support tier" generally refers to a level of support with corresponding expertise, authorities, and/or capabilities for handling service tickets. Various support tiers can be arranged in a hierarchy in a user support system. For example, a user support system can include a first support tier with support technicians, a second level with support engineers, and a third level with software developers. In another example, a user support system can include a first support tier of customer representatives, a second support tier with supervisors, and a third level with managers. One of the support tiers may be a default support tier (e.g., support technicians) for handling incoming service tickets. As discussed in more detail later, service tickets may also be directly escalated from a lower support tier to a higher support tier, and thus skipping intermediate support tiers.

In addition, as used herein, an "interaction pattern" generally refers to a sequence of words or phrases arranged in a chronological order from messages exchanged between a user of a service ticket and a support entity. In certain embodiments, the interaction pattern can be arranged as an array with words and phrases and corresponding timestamps. In other embodiments, the interaction pattern can be arranged as a table, a graph, or other suitable types of data structure identifying the words or phrases as well as a corresponding chronological order. As discussed in more detail later, an interaction model with associated interaction patterns can be developed based on data of service tickets previously handled by a user support system. Such an interaction model can be used to facilitate identifying an interaction pattern of an incoming service ticket.

In certain embodiments, an interaction model can be developed using a neural network. As used herein, the phrase "neural network" or "artificial neural network" generally refers to computing systems configured to "learn," or progressively improve performance on tasks by studying examples, generally without task-specific programming. For example, in image recognition, a neural network may learn to identify images that contain cats by analyzing example images that have been manually labeled as "cat" or "no cat" and using the results to identify cats in new images. In certain implementations, a neural network can include multiple layers of objects generally refers to as "neurons" or "artificial neurons." Each neuron can be configured to perform a function such as a non-linear activation function based on one or more inputs via corresponding connections. Artificial neurons and connections typically have a weight that adjusts as learning proceeds. The weight increases or decreases a strength of an input at a connection. Typically, artificial neurons are organized in layers. Different layers may perform different kinds of transformations on respective inputs. Signals typically travel from an input layer, to an output layer, possibly after traversing one or more intermediate layers. In other embodiments, an interaction model can be developed via other suitable machine learning or other types of techniques.

Operators of cloud computing or other types of large-scale computing systems can receive large numbers (e.g., thousands or even tens of thousands) of alerts and support requests every day. A challenge for operators of such computing systems is to achieve speedy resolution of reported incidents while maintaining costs of support low. To address such a challenge, operators can deploy a support management system for tracking alerts and support requests with service tickets and a support system with multiple support tiers of technicians, engineers, developers, etc. Higher support tiers can have more experienced and typically more expensive support facilities and/or agents than lower support tiers.

During operation, a lower support tier may initially handle incoming service tickets. A portion of the service tickets can then be escalated to a higher support tier when the lower support tier fails to address the reported issue. Such push-based escalation can take a very long time for a service ticket to reach a suitable support tier that is adequately equipped to resolve a reported issue. Long delays in providing suitable support can reduce user experience of the provided computing services and incur large expenses such as costs at each support tier and a loss of business.

Several embodiments of the disclosed technology are directed to a support management system that is configured to automatically escalate service tickets based on, inter alia, interaction patterns between a user and a support entity. As such, certain service tickets may be escalated to higher support tiers without going through intermediate support tiers. For example, the support management system can include a predictive module that is configured to predict likeliness of escalation of individual service tickets based on an interaction model. The interaction model can be developed to output a likeliness of escalation based on support interactions, service configurations, or other suitable parameters of service tickets and/or reported incidents from previous escalated service tickets. For example, a conversation pattern between a user and a support agent can be mined to identify if the conversation pattern sufficiently matches with those of previously escalated service tickets. As such, the predictive module can identify, for example, based on a preset threshold of the likeliness of escalation, a service ticket as a candidate for immediate escalation to a higher support tier and skip one or more intermediate support tiers. Thus, the higher support tier may help to resolve the escalated service ticket in a speedier fashion than having the service ticket escalated through all lower support tiers, as described in more detail below with reference to FIGS. 1-6.

FIG. 1 is a schematic diagram of a computing system 100 implementing service ticket escalation based on interaction patterns in accordance with embodiments of the disclosed technology. As shown in FIG. 1, the computing system 100 can include a computer network 108 interconnecting a plurality of users 101 via client devices 102, a computing fabric 104, and a support management system 110. Even though particular components of the computing system 100 are shown in FIG. 1, in other embodiments, the computing system 100 can also include additional and/or different constituents. For example, the computing system 100 can include additional computing fabrics, network storage devices, utility infrastructures, and/or other suitable components.

The client devices 102 can each include a computing device that facilitates corresponding users 101 to access computing services provided by the computing fabric 104 via the computer network 108. For example, in the illustrated embodiment, the client devices 102 individually include a desktop computer. In other embodiments, the client devices 102 can also include laptop computers, tablet computers, smartphones, or other suitable computing devices. Even though two users 101 and corresponding client devices 102 are shown in FIG. 1 for illustration purposes, in other embodiments, the computing system 100 can facilitate any suitable number of users 101 to access computing services provided by the computing fabric 104.

As shown in FIG. 1, the computer network 108 can include one or more network devices 112 that interconnect the users 101 and components of the computing fabric 104. Examples of the network devices 112 can include routers, switches, firewalls, load balancers, or other suitable network components. Even though particular connection scheme is shown in FIG. 1 for illustration purposes, in other embodiments, the network devices 112 can be operatively coupled in a hierarchical, flat, "mesh," or other suitable topologies. In one embodiment, the computer network 108 includes the Internet. In other embodiments, the computer network 108 can also include a local area network, a wide area network, a virtual private network, or other suitable types of computer network.

In certain embodiments, the nodes 106 can individually include a processor, a physical server, or a blade containing several physical servers. In other embodiments, the nodes 106 can also include a virtual server or several virtual servers. The nodes 106 can be organized into racks, availability zones, groups, sets, computing clusters, or other suitable divisions. For example, in the illustrated embodiment, the nodes 106 are grouped into three computing clusters 105 (shown individually as first, second, and third computing clusters 105a-105c, respectively), which are operatively coupled to corresponding network devices 112 in the computer network 108. Even though three computing clusters 105 are shown in FIG. 1 for illustration purposes, in other embodiments, the computing fabric 104 can include any other suitable numbers of computing clusters 105.

The support management system 110 can be configured to manage alerts or support requests by the users 101 for the computing services provided by the computing fabric 104 via service tickets 111. For example, upon receiving an incident report 109 from a user 101 via email, telephone, text message, instant message, or other suitable types of communication channels, the support management system 110 can be configured to create a service ticket 111 corresponding to the incident report 109 from the user 101. The support management system 110 can then track diagnosis and/or resolution of the incident report by one or more of various support tiers 103 in the computing system 100. Though each support tier 103 can include one or more support agents 113, only one is shown in FIG. 1 for brevity. Though the support management system 110 is shown in FIG. 1 as one or more servers separate from the nodes 106 in the computing fabric 104, in other embodiments, the support management system 110 can be implemented on one or more of the nodes 106 and/or as one or more computing services hosted in the computing fabric 104.

The support management system 110 can include a framework with multiple service ticket candidate modules configured to generate a list of service tickets as candidates for immediate escalation to higher support tiers. The framework can be configured to combine input from multiple candidate modules and generates a single view for support entities at various support tiers. As such, service ticket duplication for escalation may be reduced or even eliminated. In certain embodiments, the candidate modules can include a predictive module, a keyword module, a spike module, and a time-based module, as described in more detail below with reference to FIG. 2. In other embodiments, the candidate modules can also include additional and/or different modules in addition to or in lieu of the foregoing modules.

Figure 2:
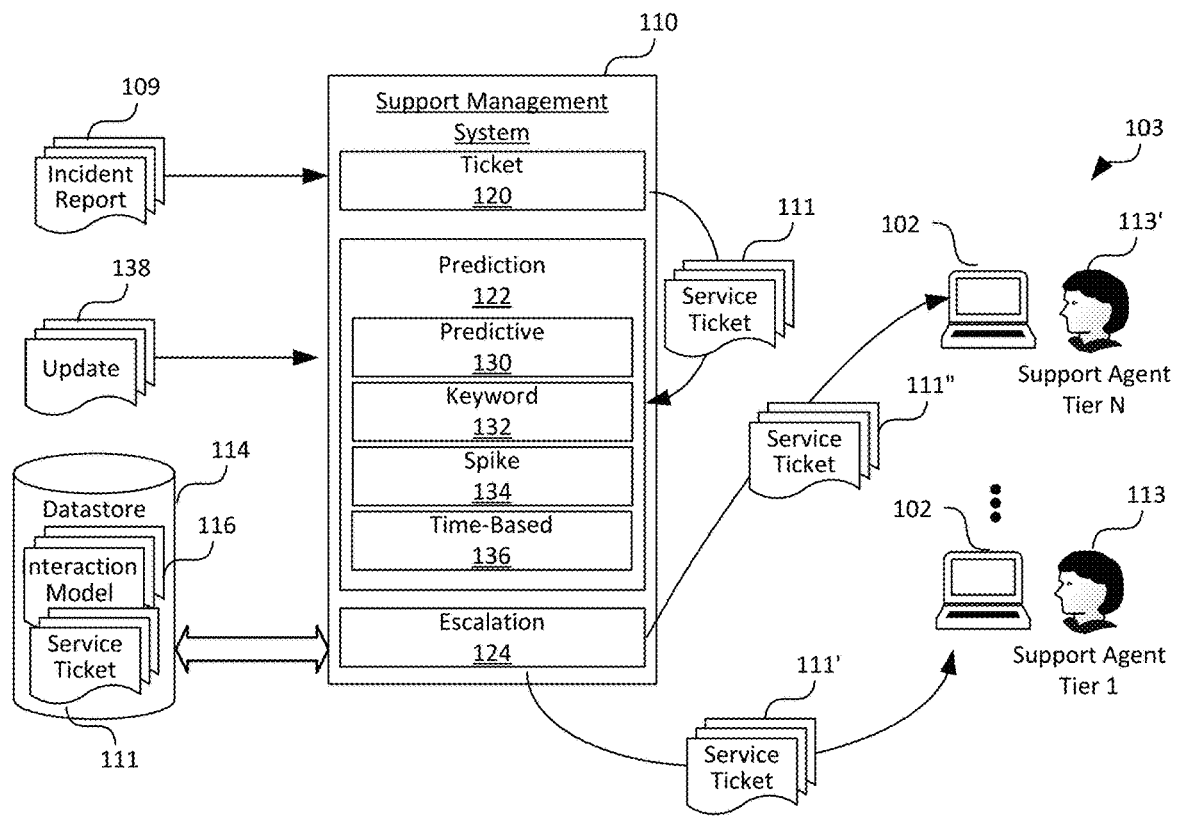
FIG. 2 is a schematic diagram illustrating example components of a support management system in accordance with embodiments of the disclosed technology.

FIG. 2 is a schematic diagram illustrating example components of a support management system 110 in accordance with embodiments of the disclosed technology. In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the support management system 110 can include a ticket component 120, a prediction component 122, and an escalation component 124 operatively coupled to one another. Though particular components are shown in FIG. 2 for illustration purposes, in other implementations, the support management system 110 can also include communication, database, and/or other suitable types of component.

The ticket component 120 can be configured to receive an incident report 109 and/or an update 138 and in response, generate and/or update a service ticket 111. For example, in one embodiment, the ticket component 120 can be configured to receive an incoming incident report 109 via email, instant message, or other suitable types of message. In response, the ticket component 120 can instantiate a corresponding service ticket 111 by, for instance, assigning a ticket number, recording a reception date, inserting incident description from the email into the service ticket 111, assigning a default support tier, and/or perform other suitable operations. In other embodiments, the ticket component 120 can also be configured to receive an update 138 containing, for instance, additional messages exchanged between a user 101 (FIG. 1) and a support agent 113. In response, the ticket component 120 can be configured to locate a corresponding service ticket 111 and modify the service ticket 111 to include the received update 138 accordingly.

As shown in FIG. 2, the ticket component 120 can also be configured to store a copy of the created or updated service ticket 111 in a datastore 114. In certain embodiments, the datastore 114 can include a network storage in the computing fabric 104 (FIG. 1). In other embodiments, the datastore 114 can include other suitable types of storage that is accessible by the support management system 110. In the illustrated embodiment, the ticket component 120 can be configured to forward a copy of the created or updated service ticket 111 to the prediction component 111 for further processing. In other examples, the prediction component 122 can be configured to retrieve and/or otherwise receive a copy of the service ticket 111 directly from the datastore 114.

The prediction component 122 can be configured to automatically escalate service tickets 111 based on, inter alia, interaction patterns between a support agent 113 and a user 101. In the illustrated embodiment, the prediction component 122 includes a predictive module 130, a keyword module 132, a spike module 134, and a time-based module 136 operatively coupled to one another. In other embodiments, the prediction component 122 can include interface, calculation, and/or other suitable types of modules in addition to or in lieu of those shown in FIG. 2.

The predictive module 130 can be configured to predict likeliness of escalation of individual service tickets 111 based on an interaction model 116. The interaction model 116 can be developed to output a likeliness of escalation based on support interactions, service configurations, or other suitable parameters of service tickets 111 and/or reported incidents from previous escalated service tickets 111. For example, a conversation pattern between a user 101 and a support agent 113 can be mined to identify if the conversation pattern sufficiently matches (e.g., above a similarity threshold) with those of previously escalated service tickets. The interaction model 116 can be developed using neural network-based or other suitable types of machine learning techniques. In one example, vector representations of messages to/from user 101/support agent 113, changing of severity of reported incident, addition of notes by the support agent 113, and/or other interaction parameters can be created for service tickets 111 that have been previously escalated. Using the created vectors, a model developer (e.g., a neural network, not shown) can apply suitable types of machine learning techniques to develop and/or update the interaction model 116.

During operation, the predictive module 130 can be configured to analyze, based on the interaction model 116, text, elapsed time, or other interaction patterns and compare such interaction patterns to those of service tickets 111 previously escalated. In one example, an interaction pattern can include a sequence of words or phrases from messages exchanged between a user 101 and a support agent 113 and arranged in a chronological order. In other examples, an interaction pattern can also include a profile of elapsed time between messages, a change of severity of the reported incident over time, a profile of notes added by the support agent 113 to the service ticket 111, and/or other suitable parameters related to interaction between the user 101 and the support agent 113.

By computing a level of difference between the interaction pattern and those of previously escalated service tickets 111, the predictive module 130 can be configured to determine a likelihood or probability that the service ticket 111 is to be escalated. In one example, the predictive module 130 can be configured to derive a difference between the interaction pattern and another interaction pattern from the interaction model 116. The difference can represent a percentage of deviation between the words or phrases in the interaction pattern and those in another interaction pattern from the interaction model 116. In another example, the predictive module 130 can also be configured to derive a difference as a percentage of deviation between the chronological order of the words or phrases in the interaction pattern and that in another interaction pattern. In further examples, the predictive module 130 can be configured to derive the difference based on one or more of the foregoing or additional parameters of the interaction pattern.

Subsequently, the predictive module 130 can be configured to determine whether the derived difference is below a threshold. In response to determining that the derived difference is below the threshold, the predictive module 130 can be configured to indicate that the interaction pattern matches another interaction pattern in the interaction model 116, and thus is to be immediately escalated. In response to determining to immediately escalate the service ticket 111, the predictive module 130 can indicate to the escalation component 124 to escalate the service ticket 111 by, for instance, update data or metadata of the service ticket 111 to indicate a new escalated support tier and transmit a copy or notification of the service ticket 111 to a support agent 113' at a higher support tier. In response to determining not to immediately escalate the service ticket 111, the predictive module 130 can wait for further updates 138 to the service ticket 111 and repeat the analysis based on the further updates.

The keyword module 132 can be configured to identify correlations of certain keywords with a likelihood of escalation of corresponding service tickets 111 and use such keywords to identify service tickets 111 as escalation candidates. For example, a list of "hot" keywords or key phrases can be generated from data or metadata of previously escalated service tickets 111 using machine learning or other suitable techniques. When an incoming service ticket 111 is received, the keyword module 132 can identify the service ticket 111 as an escalation candidate when one or more of such "hot" keywords or key phrases appear in the incoming service ticket. For instance, an example "hot" key phrase can be "email down." As such, the keyword module 132 can be configured to indicate a high likelihood of escalation of an incoming service ticket 111 when the service ticket 111 also has "email down" as a part of a problem description. In other examples, the "hot" keywords can also include certain error codes, error messages, and/or other suitable description included in the service tickets 111.

The spike module 134 can be configured to identify a systemic issue involved in multiple service tickets 111 and combine the multiple service tickets 111 as a single service ticket 111 as an escalation candidate. For instance, when multiple service tickets 111 reporting the same or similar connectivity issue, instead of tackling each service ticket 111 separately, the spike module 134 can be configured to combine all the service tickets 111 into a single service ticket 111 related to the connectivity issue. The spike module 134 can then be configured to determine whether a number of the service tickets 111 related to the single issue is abnormally higher than a threshold. In response to determining that the number is abnormally higher than the threshold, the spike module 134 can be configured to identify the combined single service ticket 111 an escalation candidate.

The time-based module 136 can be configured to identify a service ticket 111 as an escalation candidate based on an amount of elapsed time since the service ticket 111 is received or created. In certain implementations, different time thresholds can be implemented for different users 101, user groups, or types of users based on service level agreements, subscription tiers, and/or other suitable parameters. During operation, the time-based module 136 can compare an elapsed time since a service ticket 111 is pending to a corresponding time threshold. Based on the comparison, when the elapsed time exceeds the time threshold, the time-based module 136 can be configured to identify the service ticket 111 as an escalation candidate. In other implementations, a single time threshold can be set for all users.

Upon receiving the identified escalation candidates from the foregoing modules, the escalation component 124 can be configured to combine the service tickets 111 that are identified escalation candidates into a single list. The escalation component 124 can then be configured to provide the list of escalation candidates to various support entities/agents at higher support tiers 103 for selection. In certain embodiments, the escalation component 124 can provide the list to all support tiers 103 for selection. In other embodiments, the list can be provided to the various support tiers 103 from the highest to the lowest for selection. Upon detecting selection of one of the service tickets 111 by a higher support tier 103, the service ticket 111 can be removed from selection by any lower support tiers 103. In further embodiments, the prediction component 122 can also be configured identify a predicted support tier 103 for each of the escalation candidates. In response, the escalation component 124 can be configured to forward multiple different lists of service tickets 111' and 111" to corresponding support tiers 103. In yet further embodiments, the escalation candidates can be provided to the various support tiers 103 in other suitable manners.

As such, unlike push-based escalation technique according to which a service ticket 111 is escalated step-wise from lower support tiers 103 to higher support tiers 103, several embodiments of the support management system 110 can be configured to implement pull-based escalation to skip certain lower or intermediate support tiers 103. For instance, a subset of received service tickets 111 can be provided as escalation candidates to higher support tiers 103 for selection based on, for instance, criticality of reported incidents and availability of suitable support entities, or other suitable parameters. As such, service tickets 111 related to critical incidents may be prioritized to skip escalations through lower support tiers 103. By reducing delays to resolve critical incidents reported in the selected service tickets 111, speedy notification, mitigation, remediation, or resolution of reported incidents can be achieved to improve user experience of various computing services provided in computing system 100 (FIG. 1).

Figure 3:
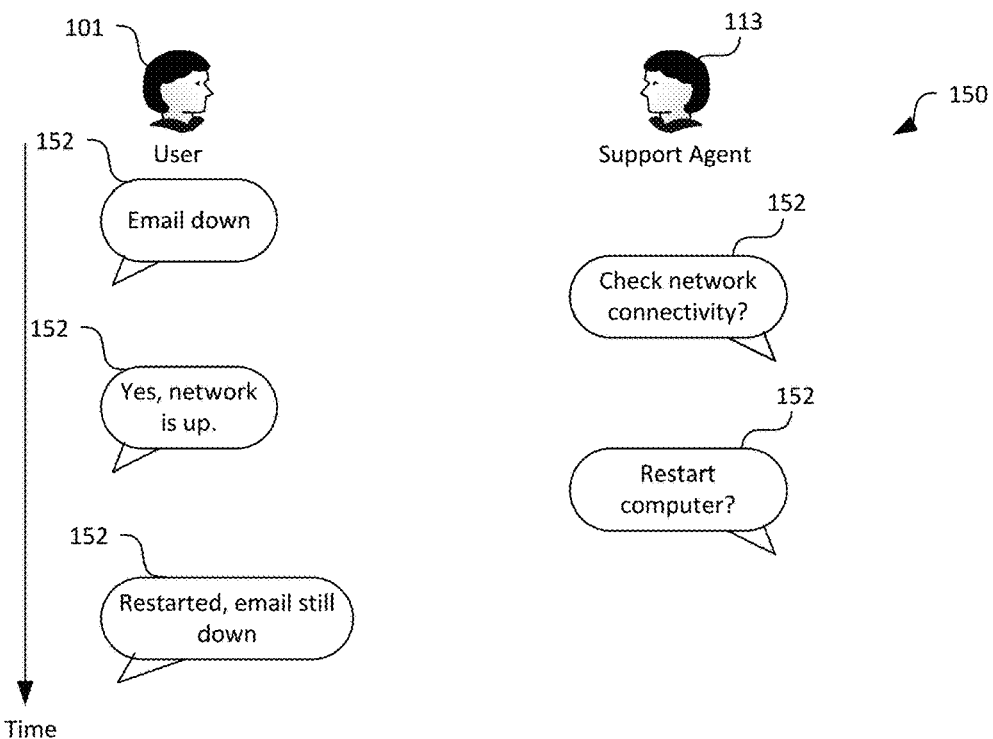
FIG. 3 is a schematic diagram illustrating an example interaction pattern in accordance with embodiments of the disclosed technology.

FIG. 3 is a schematic diagram illustrating an example interaction pattern 150 in accordance with embodiments of the disclosed technology. As shown in FIG. 3, the interaction pattern 150 can be derived as a sequence of words or phrases from multiple messages 152 between a user 101 and a support agent 113. In the illustrated example, the messages 152 are shown as instant messages. In other examples, the messages 152 can also be emails, text messages, recorded phone calls, or other suitable types of messages 152.

As shown in FIG. 3, the exchanged messages 152 are arranged along an axis representing elapsed time. In accordance with embodiments of the disclosed technology, the predictive module 130 (FIG. 2) can be configured to derive the interaction pattern 150 as a sequence of select words or phrases. For instance, one example of an interaction pattern 150 shown in FIG. 3 can be the following:

"Email down"→"Network connectivity?"→"Network up"→"Restart?"→"Email down"

Based on the derived example interaction pattern 150, the predictive module 130 can be configured to calculate a difference between the example interaction pattern 150 above and another interaction pattern in the interaction model 116, shown below:

"Email down"→"Network connectivity?"→"Network okay"→"Restart?"→"Email down"

In one implementation, the calculated difference can be based on word-wise comparison. For instance, a word-wise comparison between the foregoing two example interaction patterns 150 show a difference of about 10%. Based on the calculated difference, the predictive module 130 can then determine whether the service ticket 111 (FIG. 2) containing the interaction pattern 150 may be escalated, as discussed above with reference to FIG. 2. In other implementations, the calculated difference can be based on a difference in the chronological order or other suitable parameters of the interaction between the user 101 and the support agent 113 in addition to or in lieu of the comparison based on words or phrases.

In further implementations, the interaction model 116 can also include established derivative patterns based on similar occurrences of observed interactions in the interaction model 116. For instance, the interaction model 116 can include a first interaction pattern 150 for escalation, such as: "Email down"→"Network connectivity?"→"Network up"→Firewall settings→Firewall setting OK→"Restart?"→"Email down"

The interaction model 116 can also include a second interaction pattern 150 for escalation, such as:

"Email down"→"Net connection?"→"Net fine"→Firewall settings→Firewall setting Good→"Restart?"→"Email down"

Based on the above first and second interaction patterns 150, a derived pattern for escalation can be established, such as:

"Email down"→"Network working?"→"Net fine"→Firewall settings→Firewall setting Good→"Restart?"→"Email down"

As such, the predictive module 130 can escalate a current service ticket 111 based on the above example derived pattern while a current interaction is in process without waiting for the rest of the interaction to complete. Though words or phrases are used above to illustrate establishing derived patterns, in other implementations, other suitable factors, such as customer sentiment, may also be incorporated.

Figure 4:
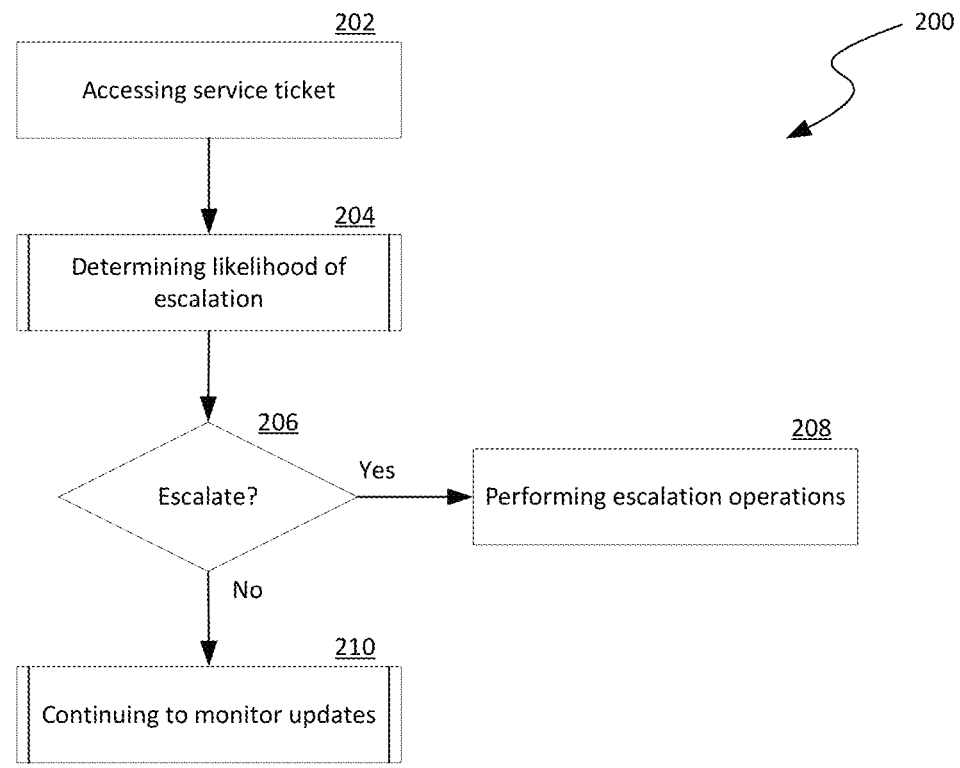
FIGS. 4 and 5 are flowcharts illustrating processes of managing service ticket escalation in accordance with embodiments of the disclosed technology.
Figure 5:
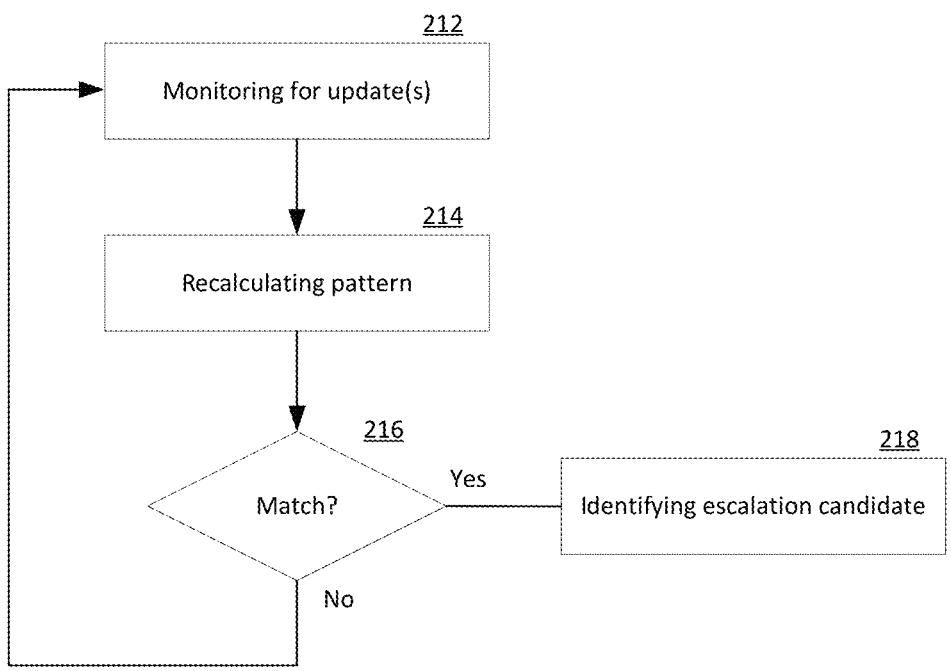

FIGS. 4 and 5 are flowcharts illustrating processes of managing service ticket escalation in accordance with embodiments of the disclosed technology. Though the processes in FIGS. 4 and 5 are described below in the context of the computing system 100 of FIG. 1, in other embodiments, the processes may be implemented in other computing systems with additional and/or different components.

As shown in FIG. 4, a process 200 can include accessing a service ticket at stage 202. In one embodiment, accessing a service ticket can include creating a service ticket in response to receiving an incident report from a user. In another embodiment, accessing a service ticket can include retrieving an existing service ticket from a datastore. In further embodiments, accessing a service ticket can include receiving a service ticket with updates of severity level changes, additional messages exchanged between a user and a support agent, additional notes by a support agent, or other suitable information. The process 200 can then include determining a likelihood of escalation at stage 204. As discussed above with reference to FIG. 2, various techniques can be applied to determine the likelihood of escalation. For instance, the predictive module 130 (FIG. 2) can be configured to predict a likelihood of escalation by comparing interaction patterns in the service ticket with others from the interaction model 116 (FIG. 2). The process 200 can then include a decision stage 206 to determine whether the service ticket is to be escalated based on the likelihood of escalation. In response to determining to escalate the service ticket, the process 200 can include performing escalation operations at stage 208. Example escalation operations can include modifying data and/or metadata of the service ticket to indicate immediate escalation of the service ticket to a higher support tier and transmitting, via a computer network, a notification of the immediate escalation of the service ticket to a support entity in the higher support tier. In response to determining not to escalate the service ticket, the process 200 can include continuing to monitor any updates to the service ticket at stage 210. Example operations of monitoring for updates are described below with reference to FIG. 5.

As shown in FIG. 5, operations of monitoring for updates to a service ticket can include monitoring for an update to the service ticket at stage 212 and recalculating an interaction pattern at stage 214. The operations can then include a decision stage 216 to determine whether the recalculated interaction pattern matches another interaction pattern from the interaction model. In response to determining that the recalculated interaction pattern matches another interaction pattern from the interaction model, the operations include identifying the service ticket as an escalation candidate at stage 218; otherwise, the operations revert to monitoring for an update to the service ticket at stage 212.

Figure 6:
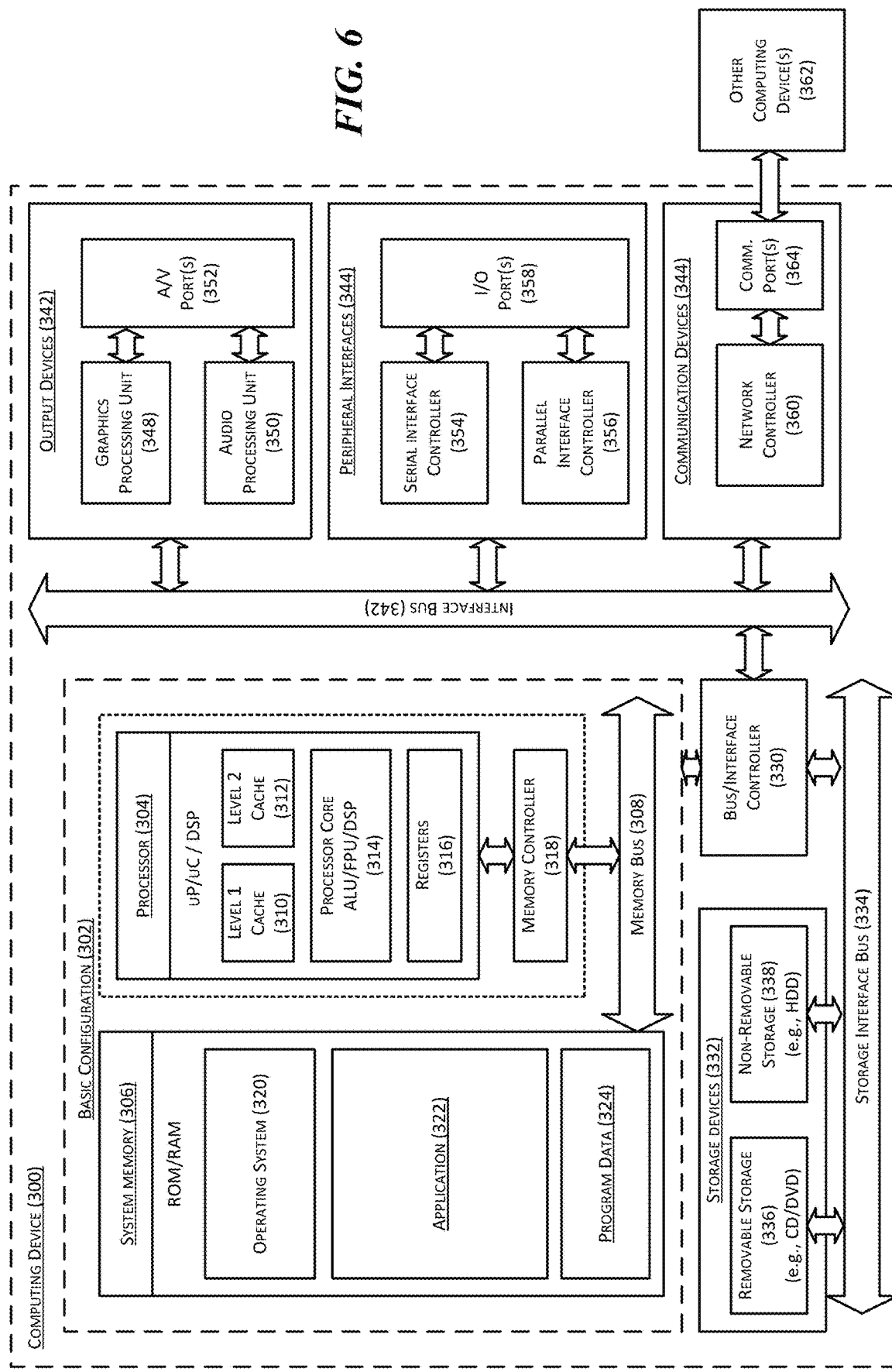
FIG. 6 is a computing device suitable for certain components of the computing system in FIG. 1.

FIG. 6 is a computing device 300 suitable for certain components of the computing system 100 in FIG. 1. For example, the computing device 300 can be suitable for the client devices 102, the nodes 106, or the support management system 110 110 in FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for managing service ticket escalation with a computing device in a computing system providing computing services to users, the computing system having multiple support tiers in a hierarchy with corresponding support entities, the method comprising:
    accessing datastore for data representing a service ticket corresponding to an alert or support request submitted by a user, the data of the service ticket having multiple messages exchanged between the user and a support entity of a current support tier in the computing system;
    analyzing the multiple messages of the service ticket to identify an interaction pattern in the multiple messages between the user and the support entity, the interaction pattern having a sequence of words or phrases arranged in a chronological order from the multiple messages exchanged between the user of the service ticket and the support entity;
    determining whether the identified interaction pattern matches another interaction pattern corresponding to a previously escalated service ticket; and
    in response to determining that the interaction pattern matches the another interaction pattern corresponding to a previously escalated service ticket,
        modifying the accessed data of the service ticket indicating automatic and immediate escalation of the service ticket to another support tier higher than the current support tier in the hierarchy of the computing system; and
        transmitting, via a computer network, a notification of the automatic and immediate escalation of the service ticket to another support entity in the another support tier.

2. The method of claim 1 wherein the another support tier corresponds to a support tier in the hierarchy to which the another service ticket was previously escalated.

3. The method of claim 1 wherein determining whether the interaction pattern matches the another interaction pattern includes:
    deriving a difference between the interaction pattern and the another interaction pattern, the difference representing a percentage of deviation between the words or phrases in the interaction pattern and those in the another interaction pattern;
    determining whether the derived difference is below a threshold; and
    in response to determining that the derived difference is below the threshold, indicating that the interaction pattern matches the another interaction pattern.

4. The method of claim 1 wherein determining whether the interaction pattern matches the another interaction pattern includes:
    deriving a difference between the interaction pattern and the another interaction pattern, the difference representing a percentage of deviation between the words or phrases in the interaction pattern and those in the another interaction pattern;
    determining whether the derived difference is below a threshold; and
    in response to determining that the derived difference is not below the threshold, indicating that the interaction pattern does not match the another interaction pattern.

5. The method of claim 1 wherein determining whether the interaction pattern matches the another interaction pattern includes:
    deriving a difference between the interaction pattern and the another interaction pattern, the difference representing a percentage of deviation between the chronological order of the words or phrases in the interaction pattern and that in the another interaction pattern;
    determining whether the derived difference is below a threshold; and
    in response to determining that the derived difference is below the threshold, indicating that the interaction pattern matches the another interaction pattern.

6. The method of claim 1 wherein determining whether the interaction pattern matches the another interaction pattern includes:
    deriving a difference between the interaction pattern and the another interaction pattern, the difference representing a percentage of deviation between the chronological order of the words or phrases in the interaction pattern and that in the another interaction pattern;
    determining whether the derived difference is not below a threshold; and
    in response to determining that the derived difference is below the threshold, indicating that the interaction pattern does not match the another interaction pattern.

7. The method of claim 1 wherein determining whether the interaction pattern matches the another interaction pattern includes:
    deriving a difference between the interaction pattern and the another interaction pattern, the difference representing a percentage of deviation between the words or phrases and the chronological order thereof in the interaction pattern and those in the another interaction pattern;
determining whether the derived difference is below a threshold; and
in response to determining that the derived difference is below the threshold, indicating that the interaction pattern matches the another interaction pattern.

8. The method of claim 1, further comprising:
in response to determining that the interaction pattern does not match the another interaction pattern corresponding to a previously escalated service ticket,
receiving an update to the accessed service ticket, the update including one or more additional messages between the user and the support entity; and
repeating the analyzing and determining operations of the service ticket based on the received update to the service ticket.

9. The method of claim 1, further comprising:
determining whether one or more of the following conditions are met by the service ticket,
one of the words or phrases in the multiple messages matches a word or phrase in a preset list;
a number of additional service tickets reporting the same alert or support request exceeds a preset threshold; or
an elapsed time of the service ticket being pending exceeds another preset threshold; and
in response to determining that one or more of the foregoing conditions are met by the service ticket, performing the modifying and transmitting operations even when the interaction pattern does not match the another interaction pattern corresponding to a previously escalated service ticket.

10. A computing device for managing service ticket escalation in a computing system providing computing services to users, the computing system having multiple support tiers in a hierarchy with corresponding support entities, the computing device comprising:
a processor; and
a memory operatively coupled to the processor, the memory having instructions executable by the processor to cause the computing device to:
retrieve, from a network datastore, data representing a service ticket corresponding to an alert or support request submitted by a user, the data of the service ticket having multiple messages exchanged between the user and a support entity of a current support tier in the computing system;
identify, from the retrieved data of the service ticket, an interaction pattern in the multiple messages between the user and the support entity, the interaction pattern having a sequence of words or phrases arranged in a chronological order from the multiple messages exchanged between the user of the service ticket and the support entity;
determine whether the identified interaction pattern matches another interaction pattern corresponding to a previously escalated service ticket; and
in response to determining that the interaction pattern matches the another interaction pattern corresponding to a previously escalated service ticket,
modify the accessed data of the service ticket indicating automatic and immediate escalation of the service ticket to another support tier higher than the current support tier in the hierarchy of the computing system; and
transmit, via a computer network, a notification of the automatic and immediate escalation of the service ticket to another support entity in the another support tier.

11. The computing device of claim 10 wherein the another support tier corresponds to a support tier in the hierarchy to which the another service ticket was previously escalated, and wherein the hierarchy includes an intermediate support tier between the support tier and the another support tier.

12. The computing device of claim 10 wherein to determine whether the interaction pattern matches the another interaction pattern includes to:
derive a difference between the interaction pattern and the another interaction pattern, the difference representing a percentage of deviation between the words or phrases and the chronological order thereof in the interaction pattern and those in the another interaction pattern;
determine whether the derived difference is below a threshold; and
in response to determining that the derived difference is below the threshold, indicate that the interaction pattern matches the another interaction pattern.

13. The computing device of claim 10 wherein to determine whether the interaction pattern matches the another interaction pattern includes to:
derive a difference between the interaction pattern and the another interaction pattern, the difference representing a percentage of deviation between the words or phrases and the chronological order thereof in the interaction pattern and those in the another interaction pattern;
determine whether the derived difference is below a threshold; and
in response to determining that the derived difference is not below the threshold, indicate that the interaction pattern does not match the another interaction pattern.

14. The computing device of claim 10 wherein the memory includes additional instructions executable by the processor to cause the computing device to:
in response to determining that the interaction pattern does not match the another interaction pattern corresponding to a previously escalated service ticket,
receive an update to the accessed service ticket, the update including one or more additional messages between the user and the support entity; and
repeat the analyzing and determining operations of the service ticket based on the received update to the service ticket.

15. The computing device of claim 10 wherein the memory includes additional instructions executable by the processor to cause the computing device to:
determine whether one or more of the following conditions are met by the service ticket,
one of the words or phrases in the multiple messages matches a word or phrase in a preset list;
a number of additional service tickets reporting the same alert or support request exceeds a preset threshold; or
an elapsed time of the service ticket being pending exceeds another preset threshold; and
in response to determining that one or more of the foregoing conditions are met by the service ticket, perform the modifying and transmitting operations even when the interaction pattern does not match the another interaction pattern corresponding to a previously escalated service ticket.

16. A method for managing service ticket escalation with a computing device in a computing system providing computing services to users, the computing system having multiple support tiers in a hierarchy with corresponding support entities, the method comprising:
performing an analysis of a service ticket corresponding to an alert or support request submitted by a user, the service ticket having data representing multiple messages exchanged between the user and a support entity of a current support tier in the computing system;
based on the performed analysis, identifying an interaction pattern in the multiple messages between the user and the support entity, the interaction pattern having a sequence of words or phrases arranged in a chronological order from the multiple messages exchanged between the user of the service ticket and the support entity;
determining whether the identified interaction pattern matches one or more interaction patterns corresponding to previously escalated service tickets; and
in response to determining that the interaction pattern matches one of the one or more interaction patterns corresponding to previously escalated service tickets, modifying the data of the service ticket indicating automatic and immediate escalation of the service ticket to another support tier higher than the current support tier in the hierarchy, thereby triggering a notification of the automatic and immediate escalation of the service ticket to another support entity in the another support tier.

17. The method of claim 16 wherein the another support tier corresponds to a support tier in the hierarchy to which the another service ticket was previously escalated.

18. The method of claim 16 wherein determining whether the interaction pattern matches the another interaction pattern includes:
deriving a difference between the interaction pattern and the another interaction pattern, the difference representing a percentage of deviation between the words or phrases in the interaction pattern and those in the another interaction pattern;
determining whether the derived difference is below a threshold; and
in response to determining that the derived difference is below the threshold, indicating that the interaction pattern matches the another interaction pattern.

19. The method of claim 16 wherein determining whether the interaction pattern matches the another interaction pattern includes:
deriving a difference between the interaction pattern and the another interaction pattern, the difference representing a percentage of deviation between the chronological order of the words or phrases in the interaction pattern and that in the another interaction pattern;
determining whether the derived difference is below a threshold; and
in response to determining that the derived difference is below the threshold, indicating that the interaction pattern matches the another interaction pattern.

20. The method of claim 16, further comprising:
in response to determining that the interaction pattern does not match the another interaction pattern corresponding to a previously escalated service ticket,
receiving an update to the accessed service ticket, the update including one or more additional messages between the user and the support entity; and
repeating the performing, identifying, and determining operations of the service ticket based on the received update to the service ticket.

* * * * *